(12) United States Patent
Tur

(10) Patent No.: US 8,731,924 B2
(45) Date of Patent: *May 20, 2014

(54) APPARATUS AND METHOD FOR MODEL ADAPTATION FOR SPOKEN LANGUAGE UNDERSTANDING

(75) Inventor: Gokhan Tur, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,057

(22) Filed: Aug. 8, 2011

(65) Prior Publication Data

US 2011/0295602 A1   Dec. 1, 2011

Related U.S. Application Data

(63) Continuation of application No. 11/085,587, filed on Mar. 21, 2005, now Pat. No. 7,996,219.

(51) Int. Cl.
*G10L 15/06* (2013.01)

(52) U.S. Cl.
USPC ........................................................ 704/244

(58) Field of Classification Search
USPC ........................................................ 704/244
See application file for complete search history.

(56) References Cited

U.S. PATENT DOCUMENTS

| | | |
|---|---|---|
| 5,918,222 A | 6/1999 | Fukui et al. |
| 6,311,159 B1 | 10/2001 | Van Tichelen et al. |
| 6,532,444 B1 | 3/2003 | Weber |
| 6,640,207 B2 * | 10/2003 | Witschel ............................ 704/9 |
| 7,139,717 B1 | 11/2006 | Abella et al. |
| 7,167,832 B2 | 1/2007 | Abella et al. |
| 7,475,015 B2 * | 1/2009 | Epstein et al. ................. 704/257 |
| 7,478,038 B2 * | 1/2009 | Chelba et al. .................... 704/10 |
| 7,991,615 B2 * | 8/2011 | Li et al. .......................... 704/254 |
| 8,078,467 B2 * | 12/2011 | Wu et al. ......................... 704/270 |
| 8,090,570 B2 * | 1/2012 | Waibel et al. ...................... 704/2 |
| 8,122,005 B1 * | 2/2012 | Juang et al. .................... 707/710 |
| 8,229,729 B2 * | 7/2012 | Sarikaya et al. .................. 704/4 |
| 8,229,743 B2 * | 7/2012 | Carter et al. ................... 704/251 |
| 8,359,209 B2 * | 1/2013 | McLaughlin et al. ............ 705/4 |
| 2002/0135618 A1 | 9/2002 | Maes et al. |
| 2002/0152068 A1 | 10/2002 | Neti et al. |
| 2003/0036903 A1 | 2/2003 | Konopka et al. |
| 2003/0105634 A1 | 6/2003 | Abella et al. |
| 2004/0117759 A1 | 6/2004 | Rippert et al. |
| 2005/0091050 A1 | 4/2005 | Surendran et al. |

(Continued)

FOREIGN PATENT DOCUMENTS

EP   1 280 136   1/2003

OTHER PUBLICATIONS

G. Di Fabbrizio, G. Tur, D. Hakkani-Tur, "Bootstrapping spoken dialog Systems with Data Reuse", Proceedings of SIGDIAL-2004, 5th SIGDIAL Workshop on Discourse and Dialogue, May 1, 2004, pages.

*Primary Examiner* — Michael N Opsasnick

(57) ABSTRACT

An apparatus and a method are provided for building a spoken language understanding model. Labeled data may be obtained for a target application. A new classification model may be formed for use with the target application by using the labeled data for adaptation of an existing classification model. In some implementations, the existing classification model may be used to determine the most informative examples to label.

20 Claims, 4 Drawing Sheets

---

- Given training data from the instance space
  $S = \{(x_1, Y_1),...,(x_m, Y_m)\}$ where $x_i \in X$ and $Y_i \subseteq Y$.
- Initialize the distribution $D_1(i,l) = 1/mk$.
- For each iteration $t = 1,...,T$ do
  - Train a base learner $h_t$ using distribution $D_t$.
  - Update $$D_{t+1}(i,l) = \frac{D_t(i,l) e^{-\alpha_t Y_i[l] h_t(x_i,l)}}{Z_t}$$

where $Z_t$ is a normalization factor an $\alpha_t$ is the weight of the base learner.
- Output the final classifier defined as:

$$f(x,l) = \sum_{t=1}^{T} \alpha_t h_i(x,l).$$

(56) References Cited

U.S. PATENT DOCUMENTS

2005/0228641 A1 10/2005 Chelba et al.
2006/0195321 A1 8/2006 Deligne et al.
2006/0212413 A1 9/2006 Rujan et al.
2007/0026406 A1 2/2007 El Ghaoui et al.
2007/0198573 A1 8/2007 Samson et al.

* cited by examiner

FIG. 3

- Given training data from the instance space
  $S = \{(x_1, Y_1),...,(x_m, Y_m)\}$ where $x_i \in X$ and $Y_i \subseteq \gamma$.
- Initialize the distribution $D_1(i,l) = 1/mk$.
- For each iteration $t = 1,...,T$ do
  - Train a base learner $h_t$ using distribution $D_t$.
  - Update
    $$D_{t+1}(i,l) = \frac{D_t(i,l) = e^{-\alpha_t Y_i [l] h_t(x_i,l)}}{Z_t}$$
    where $Z_t$ is a normalization factor an $\alpha_t$ is the weight of the base learner.
- Output the final classifier defined as:
  $$f(x,l) = \sum_{t=1}^{T} \alpha_t h_i(x,l).$$

APPARATUS AND METHOD FOR MODEL ADAPTATION FOR SPOKEN LANGUAGE UNDERSTANDING

PRIORITY

The present application is a continuation of U.S. patent application Ser. No. 11/085,587, filed Mar. 21, 2005, now U.S. Pat. No. 7,996,219, the content of which is included herewith in its entirety.

BACKGROUND OF THE INVENTION

1. Field of the Invention

The present invention relates to speech processing and more specifically to adapting an existing language model to a new natural language spoken dialog application.

2. Introduction

Natural language spoken dialog systems receive spoken language as input, analyze the received spoken language input to derive meaning from the input, and perform some action, which may include generating speech, based on the meaning derived from the input. Building natural language spoken dialog systems requires large amounts of human intervention. For example, a number of recorded speech utterances may require manual transcription and labeling for the system to reach a useful level of performance for operational service. In addition, the design of such complex systems typically includes a human being, such as a User Experience (UE) expert to manually analyze and define system core functionalities, such as, a system's semantic scope (call-types and named entities) and a dialog manager strategy, which will drive the human-machine interaction. This approach to building natural language spoken dialog systems is extensive and error prone because it involves the UE expert making non-trivial design decisions, the results of which can only be evaluated after the actual system deployment. Thus, a complex system may require the UE expert to define the system's core functionalities via several design cycles which may include defining or redefining the core functionalities, deploying the system, and analyzing the performance of the system. Moreover, scalability is compromised by time, costs and the high level of UE know-how needed to reach a consistent design.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method is provided for building a spoken language understanding model. Labeled data are obtained for a target application. A new classification model is formed for use with the target application by using the labeled data for adaptation of an existing classification model.

In a second aspect of the invention, an apparatus is provided. The apparatus includes a processor and storage for storing instructions for the processor. The apparatus is configured to obtain labeled data for a target application, and form a new classification model for use with the target application by using the labeled data for adaptation of an existing classification model.

In a third aspect of the invention, a machine-readable medium having instructions, stored therein, for a processor is provided. The machine-readable medium includes instructions for inputting labeled data for a target application, and instructions for forming a new classification model for use with the target application by using the labeled data for adaptation of an existing classification model.

In a fourth aspect of the invention, an apparatus is provided. The apparatus includes means for obtaining labeled data for a target application, and means for forming a new classification model for use with the target application by using the labeled data for adaptation of an existing classification model.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a boosting algorithm;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
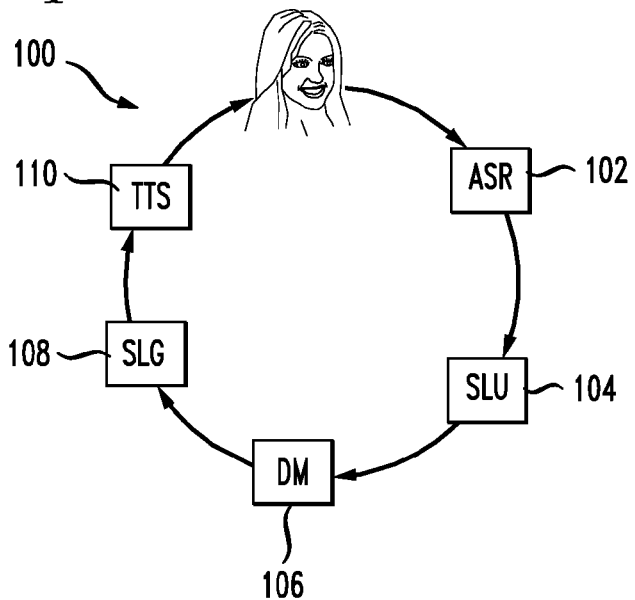
FIG. 1 illustrates an exemplary natural language spoken dialog system consistent with the principles of the invention.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
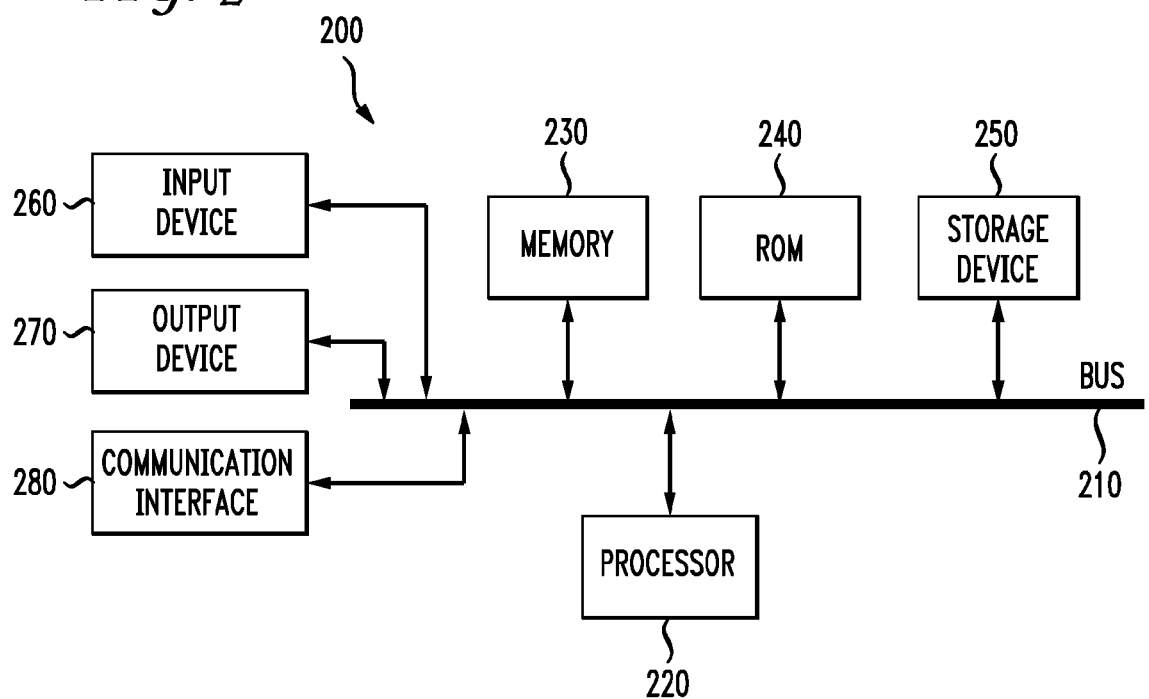
FIG. 2 illustrates an exemplary processing system which may be used to implement an embodiment consistent with the principles of the invention.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Boosting

Boosting is an iterative procedure; on each iteration, t, a weak classifier, $h_t$ is trained on a weighted training set, and at the end of training, the weak classifiers are combined into a single, combined classifier. The algorithm generalized for multi-class and multi-label classification is shown in FIG. 3. Let X denote the domain of possible training examples and let y be a finite set of classes of size |y|=k. For $Y \subseteq y$, let Y[l] for l∈y be $$Y[l] = \begin{cases} +1 & \text{if } l \in Y \\ -1 & \text{otherwise} \end{cases}$$

The algorithm may begin by initializing a uniform distribution D1 (i, l) over training examples i and labels l. After each round this distribution may be updated so that the example-class combinations, which are easier to classify, get lower weights and vice versa. The intended effect is to force the weak learning algorithm to concentrate on the examples and labels that will be the most beneficial to the overall goal of finding a highly accurate classification rule.

This algorithm can be seen as a procedure for finding a linear combination of base classifiers which attempts to minimize an exponential loss function, which in this case is:

$$\sum_i \sum_l e^{Y_i[l]f(x_i,l)}$$

An alternative would be to minimize a logistic loss function, namely $$\sum_i \sum_l \ln(1 + e^{Y_i[l]f(x_i,l)})$$

In that case, the confidence of a class, l, for an example, $x_i$ may be computed as:

$$P(Y_i[l] = +1 \mid x_i) = \frac{1}{1 + e^{-f(x_i,l)}}$$

A more detailed explanation and analysis of this algorithm can be found in R. E. Schapire, "The boosting approach to machine learning: An overview," in *Proceedings of the ICAASP*, Hong Kong, April 2003, which is incorporated by reference herein in its entirety. In experiments, a BoosTexter tool, which is an implementation of the Boosting algorithm, was used. For text categorization, BoosTexter uses word n-grams as features, and each weak classifier (or "decision stump") checks the absence or presence of a feature.

Approach

Implementations consistent with the principles of the invention may exploit existing labeled data and models for boosting the performance of new similar applications using a supervised adaptation method. The basic assumption is that there is an intent model trained with data similar to the target application. This classification model may be adapted using a small amount of already labeled data from the target application, thus reducing the amount of human-labeling effort necessary to train decent statistical intent classification systems. The very same adaptation technique may be employed to improve the existing model for non-stationary new data.

There are at least two other ways of exploiting the existing labeled data from a similar application.

Simple Data Concatenation (simple): where the new classification model is trained using the data from the previous application concatenated to the data labeled for the target application.

Tagged Data Concatenation (tagged): where the new classification model is trained using both data sets, but each set is tagged with the source application. That is, in addition to the utterances, we use the source of that utterance as an additional feature during classification.

Classification Model Adaptation

Adaptation may begin with an existing classification model. Using labeled data from a target application, a new model may be built based on the existing classification model. This method is similar to incorporating prior knowledge or exploiting unlabeled utterances for Boosting. In previous works, a model which fit both the training data and the task knowledge or machine labeled data was trained. In implementations consistent with the principles of the invention, a model that fits both a small amount of application specific labeled data and the existing model from a similar application may be trained. More formally, the Boosting algorithm tries to fit both the newly labeled data and the prior model using the following loss function:

$$\sum_i \sum_l (\ln(1 + e^{-Y_i[l]f(x_i,l)}) + \eta KL(P(Y_i[l] = 1 \mid x_i) \| p(f(x_i, l))))$$

$$\text{where } KL(p \| q) = p\ln\left(\frac{p}{q}\right) + (1-p)\ln\left(\frac{1-p}{1-q}\right)$$

is the Kullback-Leibler divergence (or binary relative entropy) between two probability distributions p and q. In implementations consistent with the principles of the invention, the probability distributions may correspond to the distribution from the prior model $P(Y_i[l]=1|x_i)$ and to the distribution from the constructed model $\rho(f(x_i,l))$, where $\rho(x)$ is the logistic function $1/(1+e-x)$. This term is basically the distance from the existing model to the new model built with newly labeled data. In the marginal case, if these two distributions are always the same, then the KL term will be zero and the loss function will be exactly the same as the first term, which is nothing but the logistic loss. Here, $\eta$ is used to control the relative importance of these two terms. This weight may be determined empirically on a held-out set.

Note that most classifiers support a way of combining models or augmenting the existing model, so although this particular implementation is classifier (i.e. Boosting) dependent, the idea is more general. For example, in implementations that use a Naive Bayes classifier, adaptation may be implemented as linear model interpolation or Bayesian adaptation (like MAP) may be employed.

Combining Adaptation with Active Learning

As an extension of this adaptation method, in some implementations consistent with the principles of the invention, adaptation may be combined with active learning. Active learning aims to minimize the number of labeled utterances by automatically selecting the utterances that are likely to be most informative for labeling. Thus, the existing model may be used to selectively sample the utterances to label for the target application, and do the adaptation using those utterances. This technique may eliminate the labeling of the examples or classes which are already covered by the existing model. It may be especially important to determine the initial set of examples to label when the labeling resources are scarce.

Figure 4:
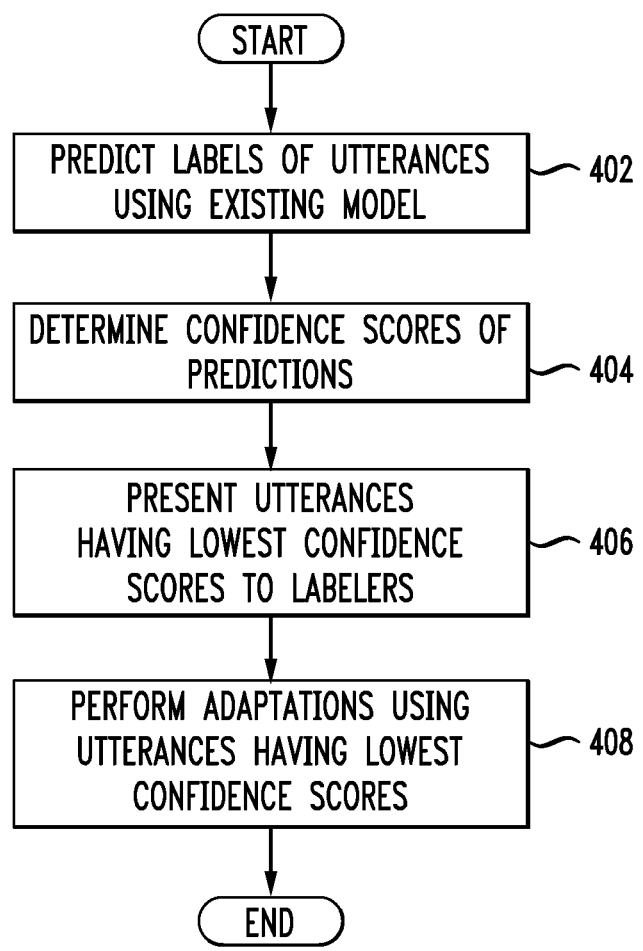
FIG. 4 is a flowchart that illustrates an exemplary process that may be performed in implementations consistent with the principles of the invention.

Since there is a previous model that may be used to obtain confidence scores for the examples from the target application, certainty-based active learning may be employed. FIG. 4 is a flowchart that illustrates an exemplary procedure that may be used in implementations consistent with the principles of the invention. The process may begin with the existing model predicting the labels of the unlabeled utterances (act 402). The confidence level or confidence score of the predicted labels may then be determined by the existing model (act 404). The confidence score may be determined by $P(Y_i[l]=+1|x_i)$, for each of the predicted labels. The predictions having the lowest certainty levels or confidence scores may then be presented to the labelers for labeling (act 406). Adaptations may be performed using the utterances having the lowest confidence scores (act 408).

Experiments and Results

The adaptation method was evaluated using utterances from a database of a commercial system. Two applications were selected, T1, and T2, both from a telecommunications domain, where users have requests about their phone bills, calling plans, etc. T1 is a concierge-like application which has all the intents that T2 covers. T2 is used only for a specific subset of intents. The data properties are shown in Table 1. As seen the call-type perplexity (computed using the prior distributions of the intents) of T2 is significantly lower while the utterances are longer. T1 has about 9 times more data than T2. All the data is transcribed. Tests were performed using the Boostexter tool. For all experiments, word 12-grams were used as features. In order not to deal with finding the optimal iteration numbers, many iterations were performed, the error rate was obtained after each iteration and the best error rate was used in all of the results below.

TABLE 1

|  | $T_1$ | $T_2$ |
|---|---|---|
| Training Data Size | 53022 | 5866 |
| Test Data Size | 5529 | 614 |
| Number of Intents | 121 | 98 |
| Call-Type Perplexity | 39.42 | 14.68 |
| Average Utterance Length | 8.06 | 10.57 |

In this experiment, the goal is to adapt the classification model for T1 using T2 so that the resulting model for T2 would perform better. Table 2 presents the baseline results using training and test data combinations. The rows indicate the training sets and columns indicate the test sets. The values are the classification error rates, which are the ratios of the utterances for which the classifier's top scoring class is not one of the correct intents. The third row is simply a concatenation of both training sets (indicated by simple). The fourth row (indicated by tagged) is obtained by training the classifier with an extra feature indicating the source of that utterance, either T1 or T2. The performance of the adaptation is shown in the last 3 rows (indicated by adapt). As seen, although the two applications are very similar, when the training set does not match the test set, the performance drops drastically. Adding T1 training data to T2 does not help, actually it hurts significantly. This negative effect disappears when we denote the source of the training data, but no improvement has been observed on the performance of the classification model for T2. Adaptation experiments using different η values indicate interesting results. By using a value of 0.1, it is actually possible to outperform the model performance trained using only T2 training data.

TABLE 2

|  | Test Set | |
| --- | --- | --- |
| Training Set | $T_1$ | $T_2$ |
| $T_1$ | 14.35% | 26.87% |
| $T_2$ | 36.43% | 13.36% |
| simple | 14.15% | 16.78% |
| tagged | 14.05 % | 13.36% |
| adapt($\eta = 0.1$) | 19.01% | 12.54% |
| adapt($\eta = 0.5$) | 16.13% | 14.01% |
| adapt($\eta = 0.9$) | 15.27% | 15.96% |

Adaptation results for the experiments.
"simple" indicates simple concatenation,
"tagged" indicates using an extra feature denoting the source of training data,
"adapt" indicates adaptation with different η values.

Figure 5:
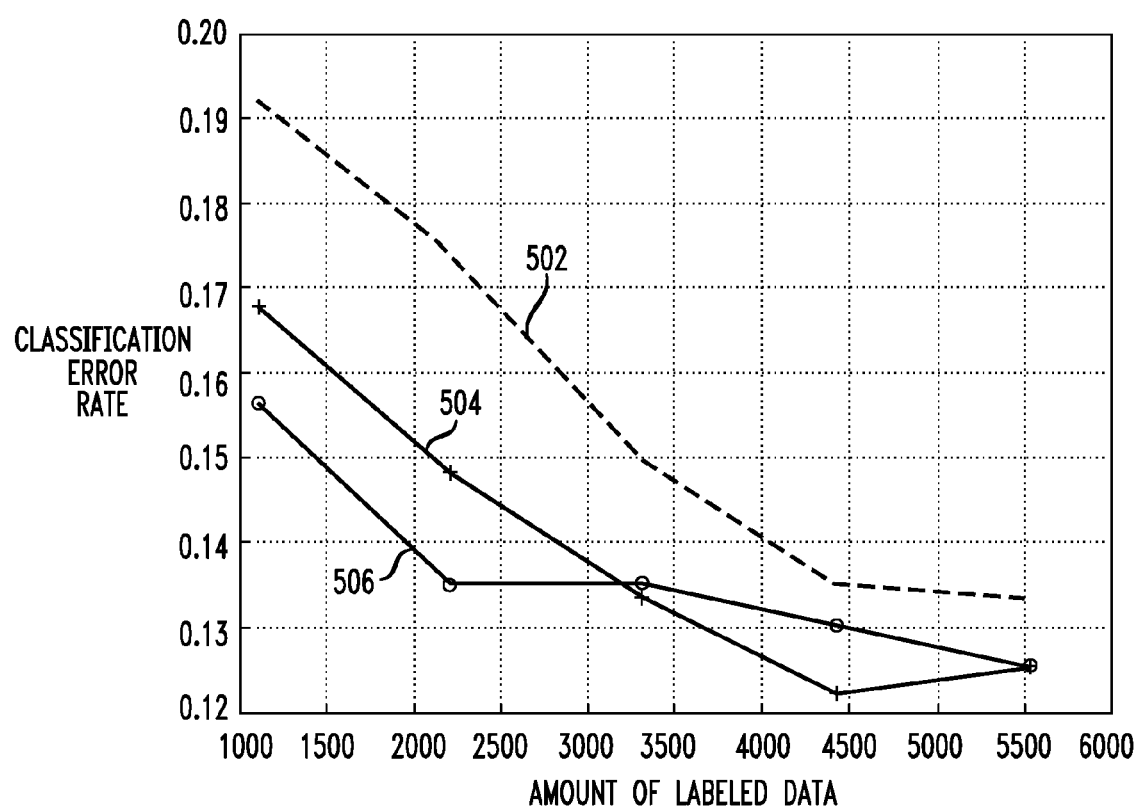
FIG. 5 illustrates the performance of methods that may be implemented in embodiments consistent with the principles of the invention.

Because the proposed adaptation method is expected to work better with less application specific training data, the learning curves are drawn as presented in FIG. 5 using 0.1 as the η value. Curve 502 is obtained using random selection of only T2 training data. When adaptation is employed with only 1,106 utterances from T2, a 2.5% absolute improvement is observed (see curve 504), which means a 56% reduction (from about 2,500 utterances to 1,106 utterances for an error rate of 16.77%) in the amount of data needed to achieve that performance. When supervised adaptation is combined with active learning (see curve 506), in which the training data is selectively sampled using the previously trained model, a further boost of another 1% absolute is achieved, making the reduction in the amount of data needed 64% (from about 3,000 utterances to 1,106 utterances for an error rate of 15.63%.). Both adaptation curves 504 and 506 meet at the end, because the pool T2, from where the utterances are selected, is fixed. One interesting point is that, after about 3,250 utterances, curve 504 outperforms the adaptation with selective sampling curve. In a real-life scenario curve 506 is expected to outperform curve 504 where the pool of candidate data is not fixed apriori.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Conclusion

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Implementations consistent with the principles of the invention may include other classification tasks, such as topic classification or named entity extraction. Accordingly, the appended claims and their legal equivalents should only define the invention, rather than any specific examples given.

I claim as my invention:

1. A method comprising:
   receiving a first language model for a first domain having a first training set;
   based on a second language model, which is smaller than the first language model, selectively sampling training data associated with a second domain from a second training set, to yield sampled training data;
   labeling, via a processor, the sampled training data, to yield second domain labeled data; and
   concatenating, via the processor, the first language model by replacing a portion of the first training set in the first language model with the second domain labeled data.

2. The method of claim 1, wherein concatenating the first language model further comprises:
   determining a distance from the first language model to the second domain labeled data; and
   modifying the first language model using the distance.

3. The method of claim 2, wherein the first language model is a speech processing model and wherein the distance comprises a logistic loss function.

4. The method of claim 1, further comprising:
   obtaining confidence scores from the first language model and a modified first language model; and
   engaging in active learning using the confidence scores.

5. The method of claim 1, wherein modifying the first language model utilizes one of a Boosting algorithm, a Naïve Bayes classifier, a linear model interpolation, and a Bayesian adaptation.

6. The method of claim 5, wherein probability distributions correspond to an existing language model probability distribution and a modified language model probability distribution.

7. The method of claim 1, further comprising labeling future utterances using a modified first language model.

8. A system comprising:
   a processor; and
   a computer-readable storage medium having instructions stored which, when executed by the processor, cause the processor to perform operations comprising:
      receiving a first language model for a first domain having a first training set;
      based on a second language model, which is smaller than the first language model, selectively sampling training data associated with a second domain from a second training set, to yield sampled training data;
      labeling the sampled training data, to yield second domain labeled data; and
      concatenating the first language model by replacing a portion of the first training set in the first language model with the second domain labeled data.

9. The system of claim 8, wherein concatenating the first language model further comprises:
   determining a distance from the first language model to the second domain labeled data; and
   modifying the first language model using the distance.

10. The system of claim 9, wherein the first language model is a speech processing model and wherein the distance comprises a logistic loss function.

11. The system of claim 8, the computer-readable storage medium having additional instructions stored which result in the operations further comprising:
   obtaining confidence scores from the first language model and a modified first language model; and
   engaging in active learning using the confidence scores.

12. The system of claim 8, wherein modifying the first language model utilizes one of a Boosting algorithm, a Naïve Bayes classifier, a linear model interpolation, and a Bayesian adaptation.

13. The system of claim 12, wherein probability distributions correspond to an existing language model probability distribution and a modified language model probability distribution.

14. The system of claim 8, the computer-readable storage medium having additional instructions stored which result in the operations further comprising labeling future utterances using a modified first language model.

15. A computer-readable storage device having instructions stored which, when executed by a computing device, cause the computing device to perform operations comprising:
   receiving a first language model for a first domain having a first training set;
   based on a second language model, which is smaller than the first language model, selectively sampling training data associated with a second domain from a second training set, to yield sampled training data;
   labeling the sampled training data, to yield second domain labeled data; and
   concatenating the first language model by replacing a portion of the first training set in the first language model with the second domain labeled data.

16. The computer-readable storage device of claim 15, wherein concatenating the existing language model further comprises:
   determining a distance from the first language model to the second domain labeled data; and
   modifying the first language model using the distance.

17. The computer-readable storage device of claim 16, wherein the first language model is a speech processing model and wherein the distance comprises a logistic loss function.

18. The computer-readable storage device of claim 15, the computer-readable storage medium having additional instructions stored which result in the operations further comprising:
   obtaining confidence scores from the first language model and a modified first language model; and
   engaging in active learning using the confidence scores.

19. The computer-readable storage device of claim 15, wherein modifying the first language model utilizes one of a Boosting algorithm, a Naïve Bayes classifier, a linear model interpolation, and a Bayesian adaptation.

20. The computer-readable storage device of claim 19, wherein probability distributions correspond to an existing language model probability distribution and a modified language model probability distribution.

* * * * *